United States Patent
Graziano et al.

[11] Patent Number: 5,593,174
[45] Date of Patent: Jan. 14, 1997

[54] CHILD CARRIAGE WITH DETACHABLE WHEEL-AXLE ASSEMBLIES

[76] Inventors: Edward Graziano; Denise Graziano, both of 24 HighPoint Dr., Springfield, N.J. 07081

[21] Appl. No.: 406,062

[22] Filed: Mar. 17, 1995

[51] Int. Cl.⁶ .................... B62B 7/00; B62B 9/08
[52] U.S. Cl. ............. 280/647; 280/658; 280/47.38
[58] Field of Search ..................... 280/638, 639, 280/641, 642, 643, 647, 648, 650, 658, 43, 43.1, 43.17, 87.05, 47.17, 47.18, 47.25, 47.3, 47.32, 47.38, 47.34; 180/906, 907; 301/111, 113, 125; 188/31, 60, 69, 82.7, 265

[56] References Cited

U.S. PATENT DOCUMENTS

| | | | |
|---|---|---|---|
| 875,245 | 12/1907 | Darrow | 280/47.32 |
| 4,703,944 | 11/1987 | Higson | 280/47.18 |
| 4,847,945 | 7/1989 | Schwartz et al. | 280/47.38 |
| 4,903,980 | 2/1990 | Schwartz | 280/658 |
| 5,257,799 | 11/1993 | Cone et al. | 280/642 |
| 5,370,408 | 12/1994 | Eagan | 280/642 |
| 5,407,218 | 4/1995 | Jackson | 280/47.34 |
| 5,460,399 | 10/1995 | Baechler et al. | 280/650 |

FOREIGN PATENT DOCUMENTS 4305592  9/1993  Germany ............... 180/907

Primary Examiner—Brian L. Johnson
Assistant Examiner—Frank Vanaman
Attorney, Agent, or Firm—Omri M. Behr, Esq.

[57] ABSTRACT

A child carriage assembly includes a frame structure and a seat assembly secured to the frame structure which comprises four depending tubular legs. The end of each leg has a detent aperture. A wheel and axle assembly includes two large diameter and width hollow plastic wheels for use on sand pinned to an axle at opposite axle ends. A detent latching mechanism is rotatably secured to the axle adjacent each wheel for attachment to a different leg end. The mechanism has a housing with a leg receiving chamber and a spring lever in the chamber with a detent projection which resiliently engages the detent aperture in each leg inserted into the chamber. A locking pin releasably locks the leg to the housing. A brake is secured to the legs via a brace and a brake collar attached to the rear axle. The collar has apertures for receiving a sliding pin attached to the brace for precluding the axle and attached wheels from rotating.

15 Claims, 5 Drawing Sheets

5,593,174

CHILD CARRIAGE WITH DETACHABLE WHEEL-AXLE ASSEMBLIES

This invention relates to baby and child carriages with releasable wheel assemblies, and more particularly, to foldable carriages.

Foldable carriages with releasable wheels are known. For example, U.S. Pat. No. 5,215,356 illustrates wheels that are detachably secured to an axle. The wheels are secured to the axle is spaced relation to receive the carriage frame leg therebetween. This locks the wheels and axle to the leg. This is cumbersome because typical carriages have four legs and the disclosed arrangement requires the wheels from each leg to be separately attached and detached.

U.S. Pat. Nos. 5,123,670, 5,205,578, 5,224,720 also show wheels detachably secured to a carriage and suffer the same drawback in that each wheel needs to be assembled separately. Also, a further disadvantage in the above patents is that other components in addition to the wheels need to be assembled and disassembled. These can easily be misplaced or lost by a user making the carriage useless.

A need is seen for a wheel assembly that can easily be attached to the carriage frame as an assembly without additional components and parts. In this way the carriage frame and wheel assemblies are self contained for attachment to each other. A need is also seen for a carriage that can be easily used on sand or soft soil.

A child carriage assembly according to the present invention comprises a carriage structure for supporting a child, the structure including a frame and a seat assembly supported by the frame, the frame including at least one front leg and at least one rear leg depending from the seat assembly. First and second wheel and axle assemblies each include at least one wheel secured to a corresponding axle in fixed axial position. Latch means are included including a housing and detent means engagable with a corresponding leg for releasably and rotatably attaching the first axle assembly to the at least one front leg and for releasably attaching the second axle assembly to the at least one rear leg.

In a further embodiment, a pair of spaced wheels are attached to the axle of at least one of the axle assemblies.

In a further embodiment, the latch means comprises a plurality of housings, each housing corresponding to a different leg and including a resilient detent member secured to each housing, the housings each having an opening for receiving a corresponding leg, each leg having a detent member receiving aperture dimensioned to engage a corresponding detent member when that leg is inserted into the housing opening.

In a still further embodiment, the latch means further includes a pin releasably attached to each the housing and each the corresponding inserted leg for securing that housing to that leg.

In a further embodiment, the wheels are sufficiently wide and large in diameter so as to exhibit negligible sinking when rolled on sand.

BRIEF DESCRIPTION OF THE DRAWING

In FIG. 1 carriage assembly 2 comprises a collapsible frame 4 and a seat assembly 6 for carrying a child. A pair of wheel and axle assemblies 8 and 10 are releasably secured to the frame 4.

Figure 1:
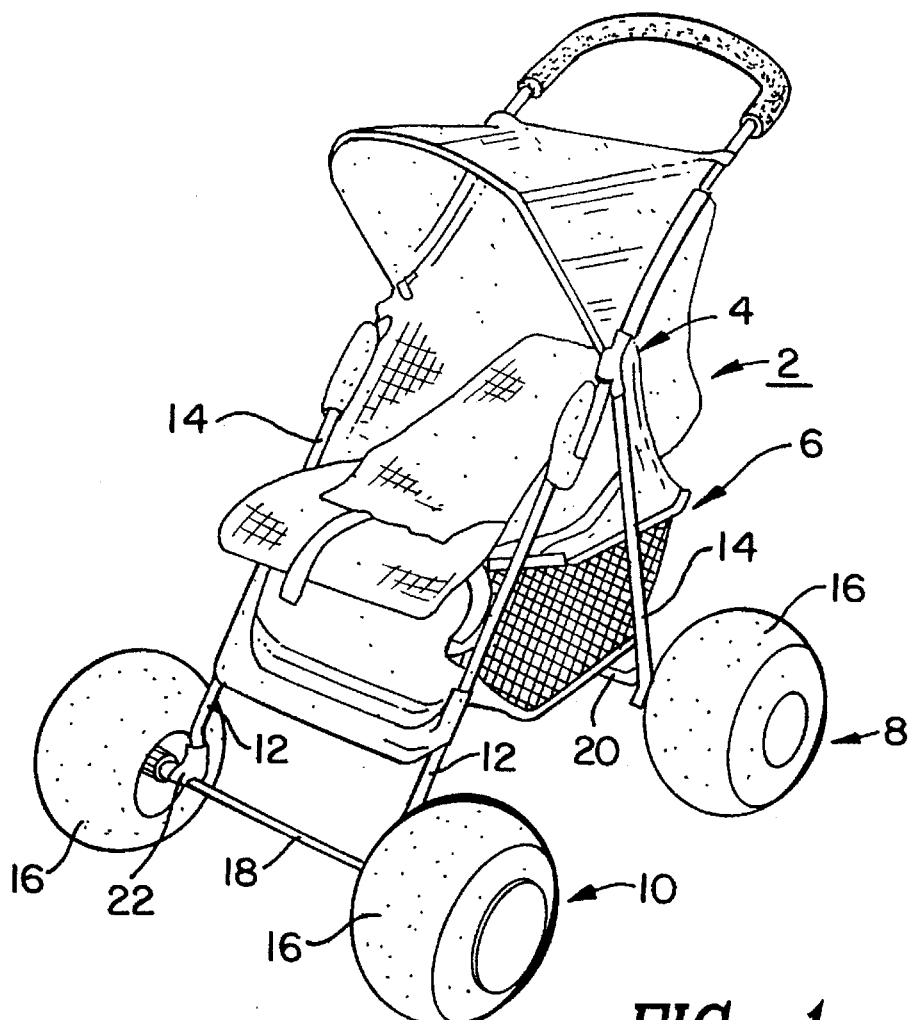
FIG. 1 is an isometric view of a child carriage according to an embodiment of the present invention.

The frame 4 includes four depending tubular preferably circular cylindrical metal front legs 12 and rear legs 14. Each of the wheel assemblies 8 and 10 include a pair of spaced wheels 16 fixed to a corresponding axle 18 and 20. The wheels are fixed to the corresponding axle in fixed axial and annular position and rotate with that axle as will be explained in more detail below. Secured to each axle adjacent to a wheel 16 is a latching assembly 22 which latches to a corresponding leg 12 or 14. The latching assemblies are identical and, therefore, the description of assembly 22 in FIGS. 2, 3, 4, 4A and 4B is representative.

In these Figs., latching assembly 22 comprises a preferably molded thermoplastic housing 24. Housing 24 has an opening 26 for closely receiving an end of leg 14. Opening 26 has a distal end region 28, FIG. 3, that is enlarged so that a person can insert a finger or tool therein. The region 28 also has a longitudinal leg receiving channel 30 in communication with the opening 26. The received leg 14 rests in the channel 30 when attached to the housing 24. The housing 24 has axle receiving bearing journals 32.

Figure 3:
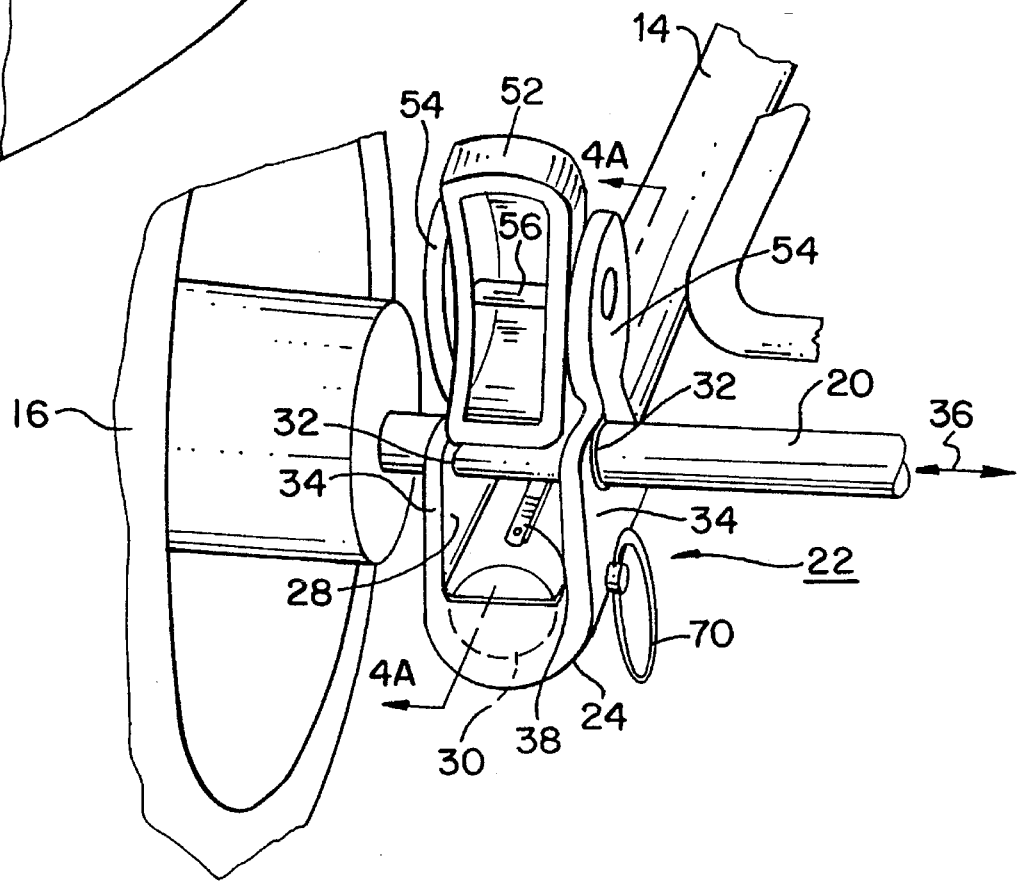

In FIG. 3, the housing 24 at region 28 has opposing side walls 34. A journal 32 is in each side wall 34. The axle 20 is free to rotate and slide axially in directions 36 in journals 32.

Figure 4:
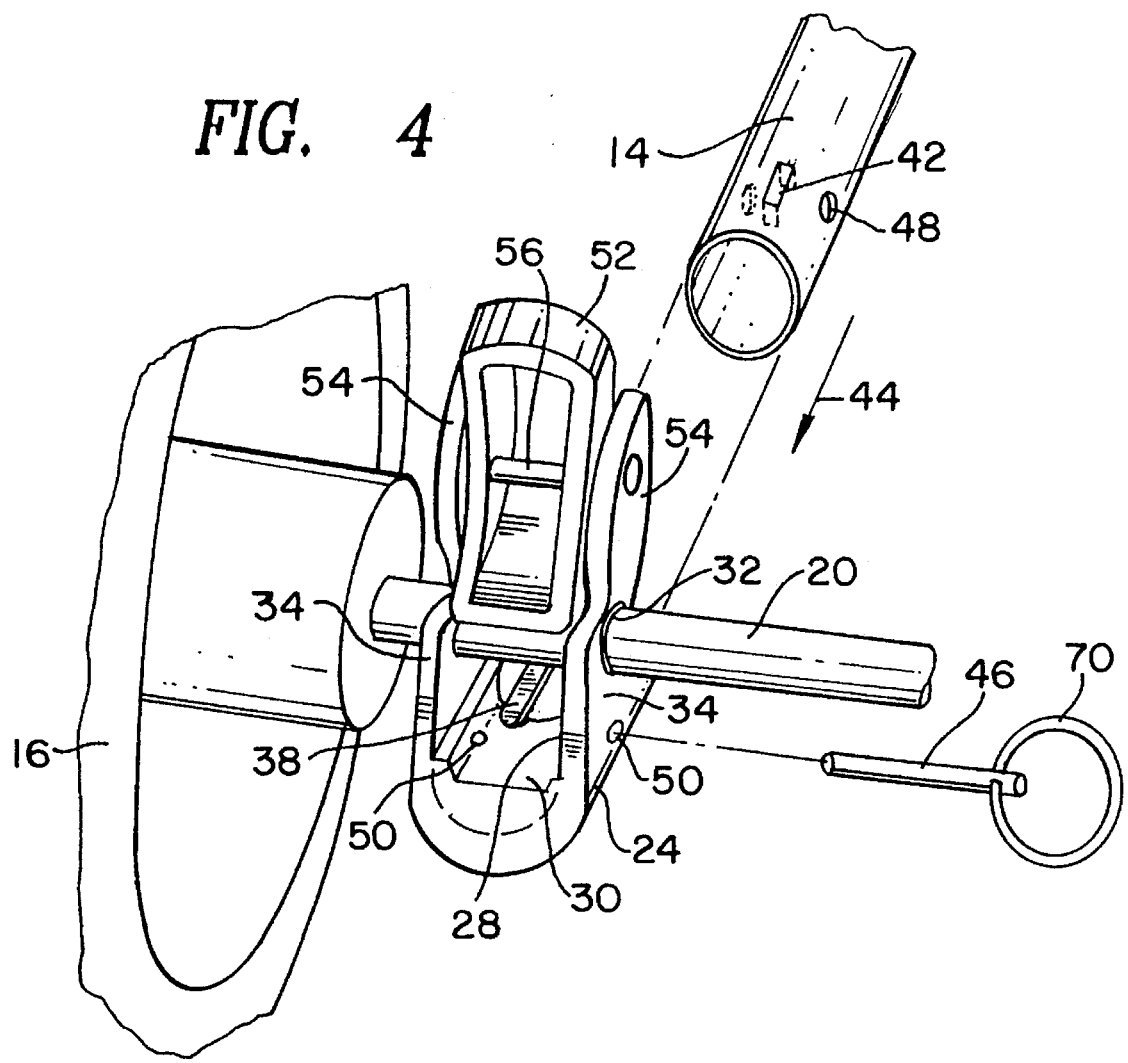
FIG. 4 is an exploded view of the assembly of FIG. 3.
Figure 4A:
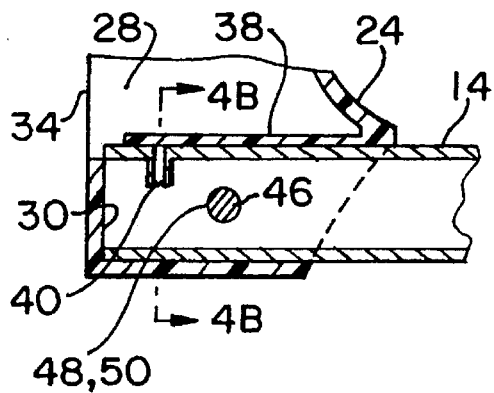
FIG. 4A is a sectional fragmentary view of the embodiment of FIG. 3 taken along lines 4A—4A.

A detent tongue 38 is formed integral with the housing 24 and is cantilevered from the housing as shown in FIG. 4A. The tongue 38 has a detent projection 40. The projection is resilient in a direction normal to the plane of the tongue 38.

The leg 14, as typical with all of the legs, has a detent projection receiving hole 42, FIG. 4, which is rectangular in cross section as is the projection 40. When leg 14 is axially inserted into opening 26 of housing 24 in direction 44, FIG. 4, the tongue 38 and projection 40 are deflected by the leg and snap into place into the hole 42 when aligned. They are aligned when the end edge of the leg 14 is fully inserted into channel 30, FIG. 3. While the housing is preferably thermoplastic it could also comprise metal. The tongue 38 is sufficiently thin so as to permit the resilient deflection. To release the tongue projection 40 from the hole 42, a finger or tool may be inserted in region 28 to lift the tongue to disengage the projection from the hole 42. At this time the leg easily slides out of the opening 28 in the housing 24 in a direction opposite direction 44.

Figure 4B:
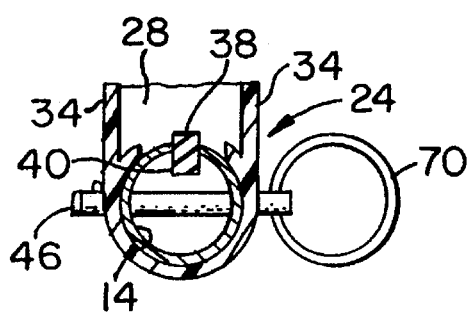
FIG. 4B is a sectional elevation view taken along lines 4B—4B in FIG. 4A.

To provide a further locking action of the leg 14 to the housing 24, a pin 46 is passed through leg 14 via holes 48 in the leg 14 and through holes 50 in the housing walls 34, FIGS. 4, 4A and 4B. This precludes forces on the leg 14 from deflecting the tongue 38 and possibly releasing the leg. The pin 46 is closely received and held in position in the housing and leg 14 by friction. If desired a ball-spring detent mechanism (not shown) can be attached to the end of pin 46 to hold it in place to the housing 24.

A cap 52, also molded thermoplastic material, is rotatably secured to ears 54 of the housing 24. The cap rotates about shaft 56 to close the end of open region 28.

Figure 5:
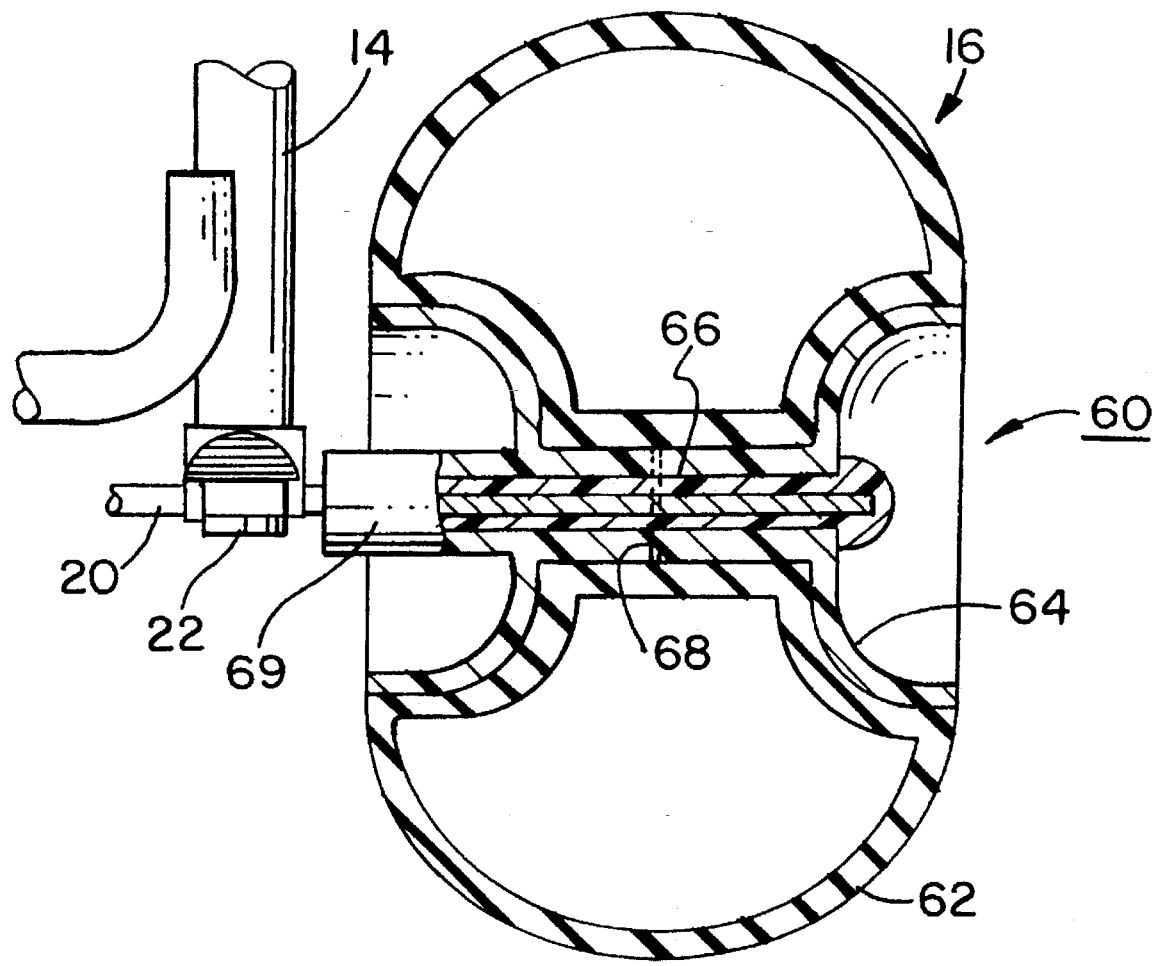
FIG. 5 is a sectional elevation view of a representative wheel and axle assembly attached to a carriage frame leg.
Figure 6:
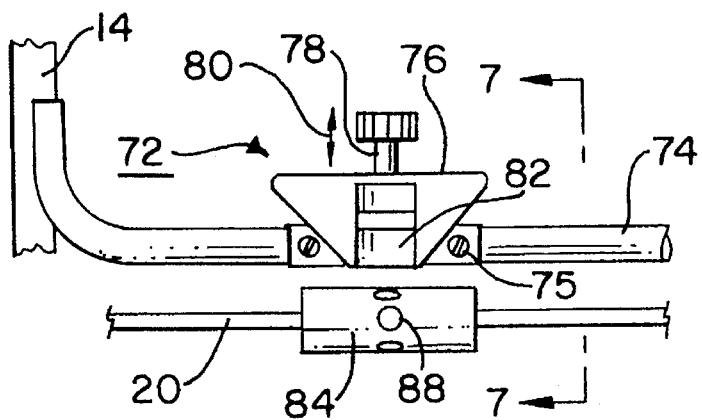
FIG. 6 is a fragmented side elevation view of a brake mechanism used on the rear axle of the embodiment of FIG. 1.

In FIG. 5, representative wheel 16 and axle 20 assembly 60 is shown wherein the wheel 16 comprises a tire 62 attached to a rim 64. The tire and rim preferably are molded thermoplastic material. The tire and rim are sufficiently flexible so to be later assembled as shown. A thermoplastic bushing 66 is between the rim 64 and axle 20. The rim 64 is fixed axially and rotationally to the axle 20 by transverse pin 68. Thus the axle 20 and wheel 16 rotate together at all times. However, the axle 20 rotates relative to the housing 24. The rim 64 is formed with a hub 69. Hub 69 provides additional support for the axle 20 to the rim 64.

Figure 1A:
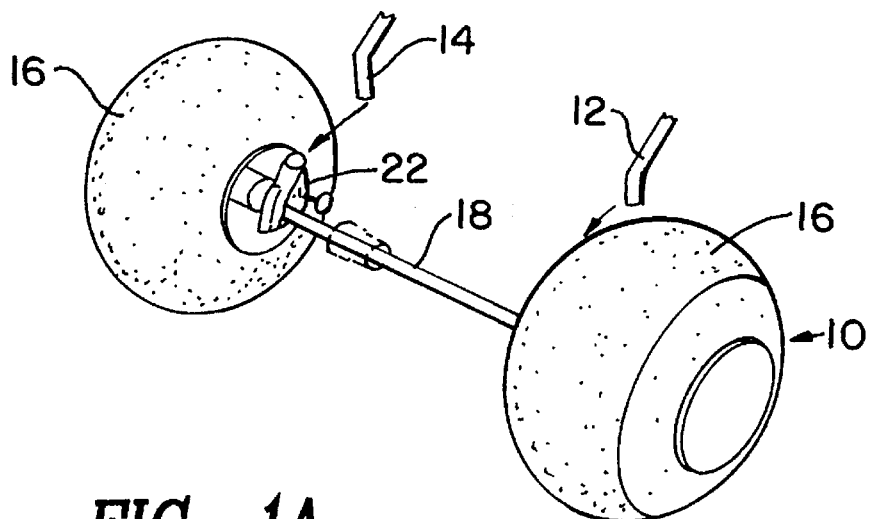
FIG. 1A is an isometric view of a representative wheel assembly for use in the embodiment of FIG. 1.
Figure 2:
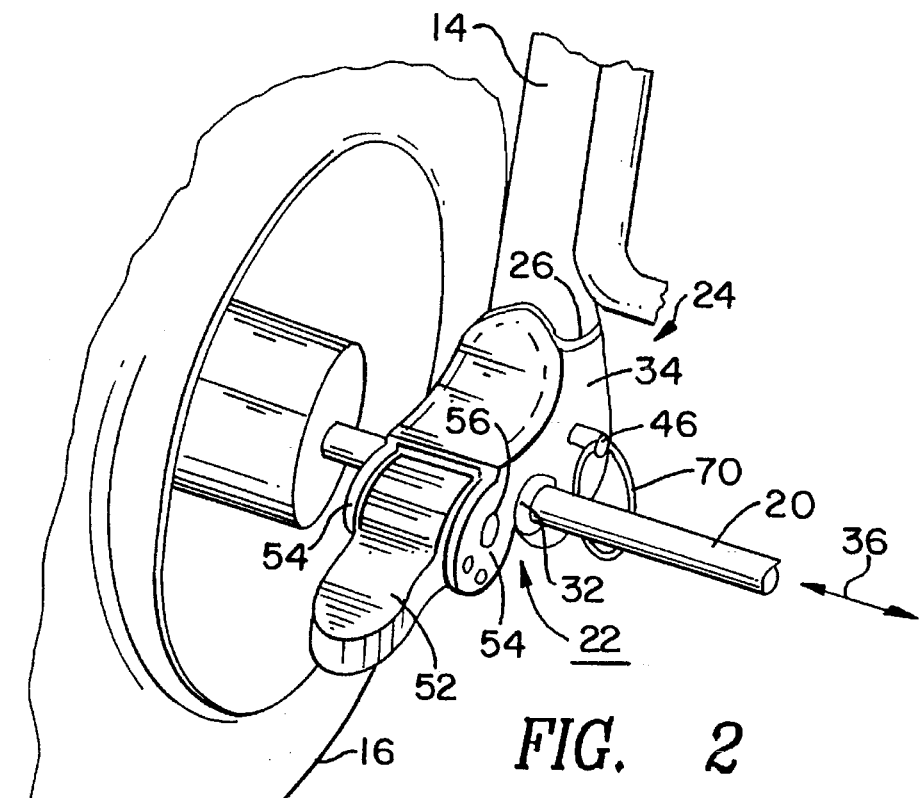
FIGS. 2 and 3 are different isometric views of a representative wheel and frame leg latch mechanism, FIG. 3 showing the underside of the mechanism of FIG. 2.

While the axle 20 is free to slide axially in the latch assemblies 22 at opposite ends of the axle, the wheels 16 fixed in position to the axle 20 locks the latch assemblies 22 on the axles 20. Therefore, as shown in FIG. 1A, the wheel and axle assembly 10 with the latching assemblies 22 attached is assembled to the legs 12 as a single unit with no other components except for the locking pin 46, which can be secured to a key ring by its ring 70 when not in use.

Figure 7:
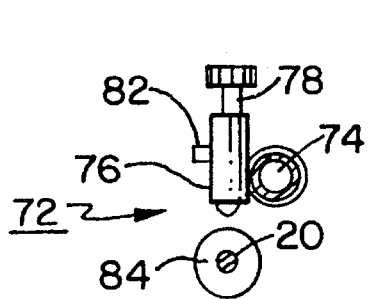
FIG. 7 is a sectional view of the assembly of FIG. 6 taken along lines 7—7.
Figure 8:
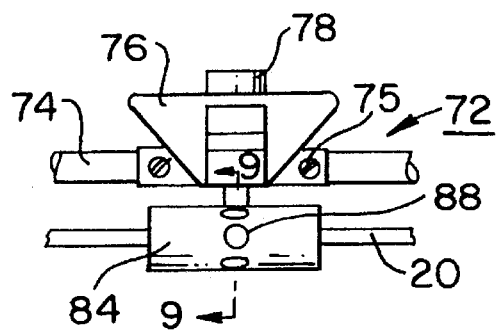
FIG. 8 is a view similar to that of FIG. 6 showing the brake mechanism in the braking engaged mode.
Figure 9:
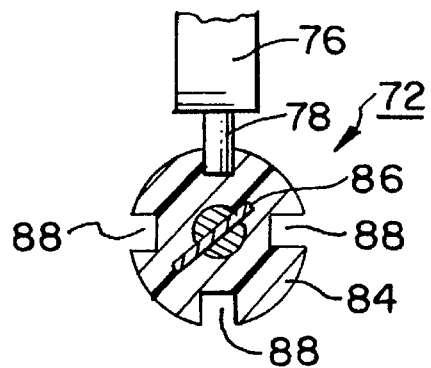
FIG. 9 is a sectional view taken along lines 9—9 of FIG. 8.

In FIG. 7, A brake assembly 72 comprises a tubular metal brace 74 secured to and between legs 14. A metal housing 76 is fastened to brace 74 by sleeve 75. A pin 78 slides in an aperture in housing 76 in directions 80. The pin 78 is detented to the housing 76 by a detent tab 82. A collar 84 is fastened in fixed position to axle 20 by pin 86, FIG. 9. The collar 84 has four equally annularly spaced apertures 88 dimensioned to closely receive pin 78.

To operate the brake assembly 72, the pin is inserted into a selected aperture 88 and held in place by the detent tab 82 by a detent arrangement (not shown). This rotationally locks the axle 20. Since the wheels 16 are fixed to the axle, they also can not rotate. A brake assembly 72 may be attached to the rear or front or both axle wheel assemblies 8 and 10.

While two wheels are shown attached to corresponding two legs of the frame, the two wheels may also be attached with the attached axle to a single leg. Also, in the alternative, a single wheel and single latching assembly 22 may be used to attach to one leg, using a clamp (not shown) to lock the latching mechanism 22 to the axle at the other axle end. Thus except for the locking pin 46, the wheel and axle assemblies are assembled to the corresponding leg of the carriage frame in a simple and easy detent latching arrangement. No tools are necessary for such assembly and disassembly.

The wheels 16 are molded sufficiently large in diameter and width, e.g., at least about 8 inches each, such that the wheels easily ride over sand with out sinking therein. Preferably the wheels are one foot in diameter and width. Because the wheels are hollow molded thermoplastic, they are light and the wheel and axle assemblies are portable and easily carried, even by a child.

What is claimed is:

1. A child carriage assembly comprising:

a carriage structure for supporting a child, said structure including a frame and a seat assembly supported by the frame, the frame including a pair of front spaced legs and a pair of rear spaced legs depending from the seat assembly;

first and second wheel and axle assemblies each including a pair of spaced wheels, each pair of wheels being secured to a corresponding axle in fixed axial and rotational position on the corresponding axle; latch means for receiving each leg and secured to each axle assembly for releasably attaching the first axle assembly to the front spaced legs and for releasably attaching the second axle assembly to the rear spaced legs; and a brace attached to and between at least one pair of legs and mating brake means secured to the brace and to the axle of the corresponding axle assembly to preclude rotation of the axle of the corresponding axle assembly and the pair of wheels associated with said corresponding axle assembly.

2. The carriage assembly of claim 1 wherein the latch means comprises a plurality of housings, a pair of housings being secured in spaced relation to each axle, each housing for releasable attachment to a corresponding different one of said legs and including a resilient detent member secured to each housing, said housings each having an opening for receiving a corresponding leg, each leg having a detent member receiving aperture dimensioned to engage a corresponding detent member when corresponding leg is inserted into said corresponding housing opening.

3. The carriage assembly of claim 2 wherein the latch means further includes pin means releasably attached to each said housing and each said corresponding inserted leg for releasably locking the corresponding said housing to inserted corresponding leg.

4. The carriage assembly of claim 1 wherein said wheels are dimensioned to roll over soft granular sand material with negligible sinking into the sand material.

5. The carriage assembly of claim 4 wherein the wheels each have a diameter of at least about 8 inches and a width of at least about 8 inches.

6. The carriage assembly of claim 4 wherein the wheels are hollow molded thermoplastic.

7. The carriage assembly of claim 1 wherein the brake means comprises movable pin means secured to said at least one front and rear pair of legs and collar means secured to the axle of the at least one of said wheel and axle assemblies, said collar means including a plurality of brake apertures in an annular array about the corresponding axle, each brake aperture for selectively receiving said pin means for rotatably securing said corresponding axle.

8. A child carriage assembly comprising:

a carriage structure for supporting a child, said structure including a frame and a seat assembly supported by the frame, the frame including at least one front leg and a pair of rear legs depending from the seat assembly;

front and rear wheel and axle assemblies each including an axle, at least one wheel secured to a front axle assembly axle for attachment to the at least one front leg and a pair of spaced wheels secured to the rear axle assembly axle for attachment to the rear legs, said pair of wheels being in fixed axial and rotational position on said rear axle;

latch means including a housing and detent means engagable with a corresponding leg for releasably and rotatably attaching the front axle assembly to the at least one front leg and for releasably attaching the rear axle assembly to the pair of rear legs; and a brace member secured to and between said pair of rear legs, a movable pin secured to one of said brace member and rear axle and a collar secured to the other of said rear axle and brace member, said collar having a plurality of apertures each for engaging said pin for selectively rotatably locking the rear axle.

9. The carriage assembly of claim 8 including a pair of spaced wheels fixedly attached to the front axle.

10. The carriage assembly of claim 8 wherein the latch means comprises a plurality of housings, each housing corresponding to a different leg and including a resilient detent member secured to each housing, said housings each having an opening for receiving a corresponding leg, each leg having a detent member receiving aperture dimensioned to engage a corresponding detent member when said corresponding leg is inserted into said housing opening.

11. The carriage assembly of claim 10 wherein the latch means further includes a pin releasably attached to each said housing and each said corresponding inserted leg for securing said housing to said leg.

12. The carriage assembly of claim 8 wherein the front axle assembly includes a pair of spaced front wheels attached to the front axle, the frame including a pair of front legs, each leg for attachment to a corresponding axle adjacent a wheel of the corresponding axle assembly.

13. The assembly of claim 8 wherein said wheels are sufficiently wide and large in diameter so as to exhibit negligible sinking when rolled on sand.

14. A child carriage assembly comprising:

a carriage structure for supporting a child, said structure including a frame and a seat assembly supported by the frame, the frame including a pair of front spaced legs and a pair of rear spaced legs depending from the seat assembly;

first and second wheel and axle assemblies each including a pair of spaced wheels each secured to a corresponding axle in fixed axial position; and latch means for receiving each leg and secured to each axle assembly for releasably attaching the first axle assembly to the front spaced legs and for releasably attaching the second axle assembly to the rear spaced legs;

said latch means comprising a plurality of housings, a pair of housings being secured in spaced relation to each axle, each housing for releasable attachment to a corresponding different one of said legs and including a resilient detent member secured to each housing, said housings each having an opening for receiving a corresponding leg, each leg having a detent member receiving aperture dimensioned to engage a corresponding detent member when the corresponding leg is inserted into said corresponding housing opening;

the latch means further including pin means releasably attached to each said housing and each said corresponding inserted leg for releasably locking each said housing to its corresponding leg.

15. A child carriage assembly comprising:

a carriage structure for supporting a child, said structure including a frame and a seat assembly supported by the frame, the frame including at least one front leg and at least one rear leg depending from the seat assembly;

first and second wheel and axle assemblies each including at least one wheel secured to a corresponding axle in fixed axial position; and latch means including a housing and detent means engagable with a corresponding leg for releasably and rotatably attaching the first axle assembly to the at least one front leg and for releasably attaching the second axle assembly to the at least one rear leg;

said latch means comprising a plurality of housings, each housing corresponding to a different leg and including a resilient detent member secured to each housing, said housings each having an opening for receiving a corresponding leg, each leg having a detent member receiving aperture dimensioned to engage a corresponding detent member when the corresponding leg is inserted into said housing opening;

the latch means further including a pin releasably attached to each said housing and each said corresponding inserted leg for securing each said housing to a corresponding leg.

\* \* \* \* \*